Sept. 11, 1934.  F. L. O'BRYAN  1,973,355
PROPELLER
Filed Jan. 3, 1934   2 Sheets-Sheet 1
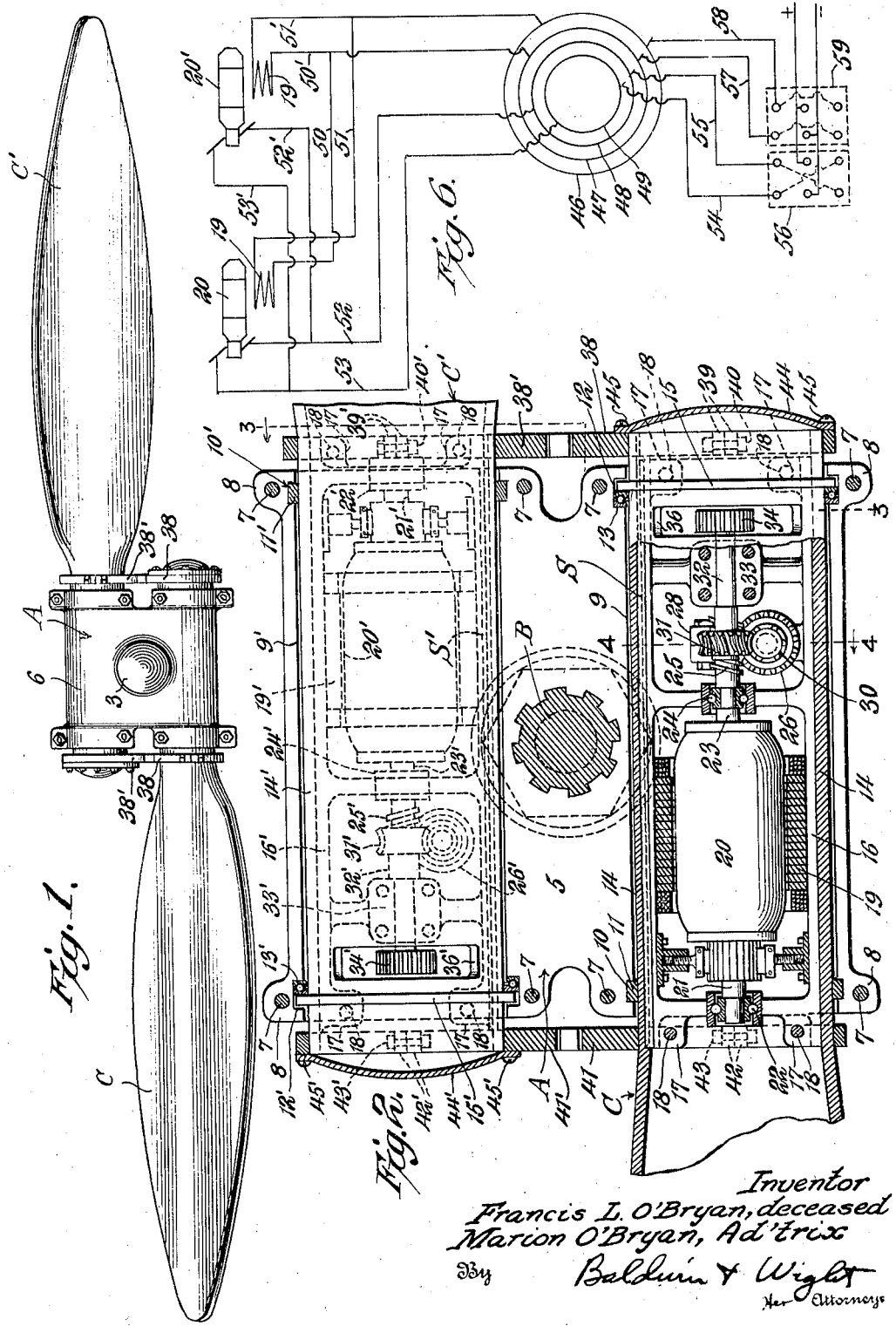
Inventor
Francis L. O'Bryan, deceased
Marion O'Bryan, Ad'trix
By Baldwin & Wight
Her Attorneys

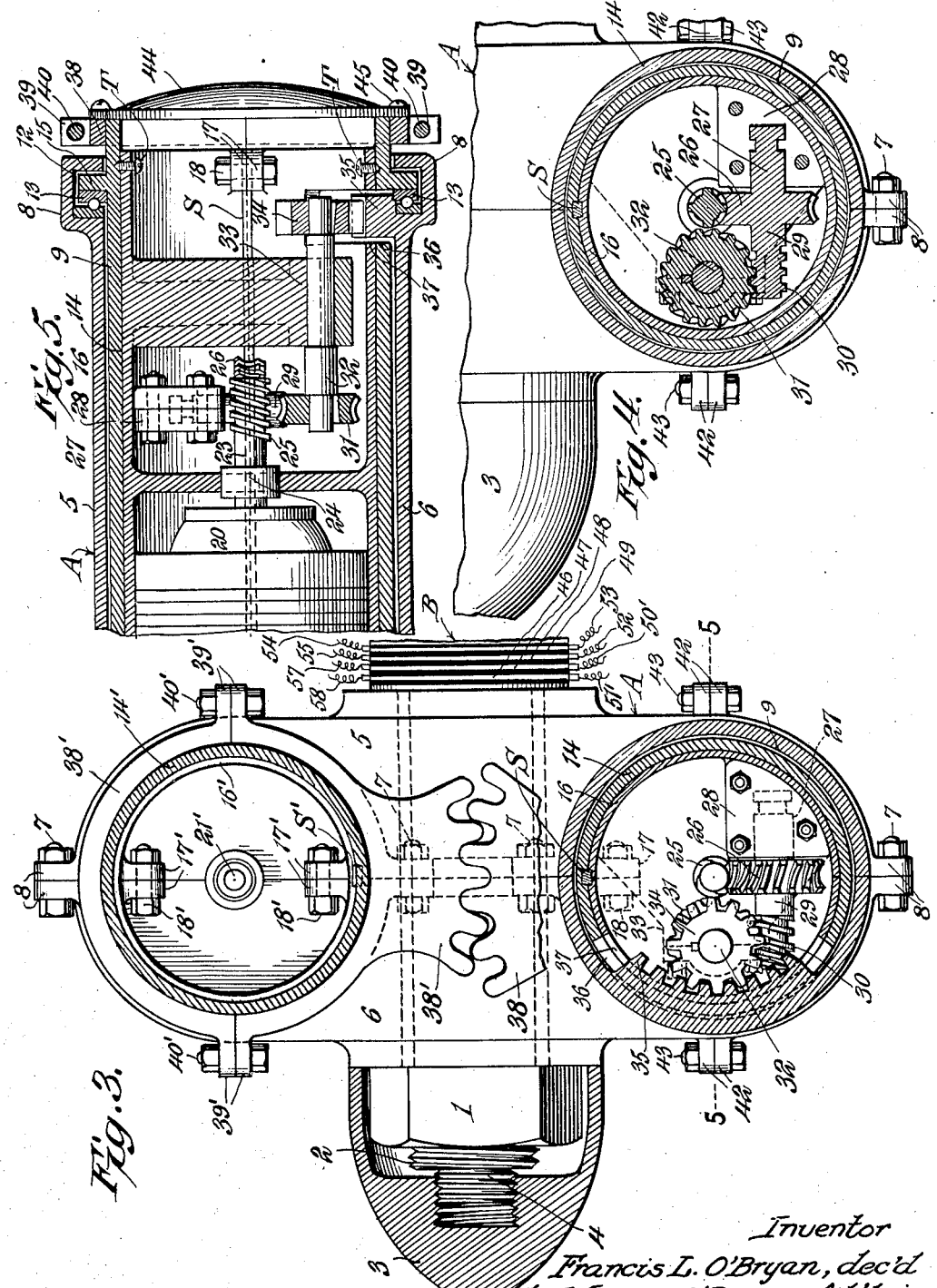

Patented Sept. 11, 1934

1,973,355

UNITED STATES PATENT OFFICE 1,973,355

PROPELLER

Francis L. O'Bryan, deceased, late of Framingham, Mass., by Marion O'Bryan, administratrix, Framingham, Mass., assignor of one-fourth to John A. Williams, Framingham, Mass.

Application January 3, 1934, Serial No. 705,146

15 Claims. (Cl. 170—163)

This invention relates to propellers and more particularly to variable pitch propellers, i. e., propellers having blades adapted to be adjusted about their radial axes. It has been found that propellers, especially airplane propellers, having a fixed "pitch" can operate at maximum efficiency only at certain rotative speeds and when the airplane is moving under certain conditions. This is due to the fact that for quick acceleration and a quick take-off and climb the propeller should have a relatively low pitch angle, whereas, after the plane has accelerated to flying speed and has gained altitude a relatively high pitch angle results in most efficient operation.

An object of the invention is to provide an improved and efficient variable pitch propeller the blades of which may be adjusted about their radial axes during operation of the propeller.

Another object is to provide a propeller of the general character stated above including a novel and improved arrangement of motor-operated mechanism for effecting change of the pitch angle during rotation of the propeller.

A further object is to provide a propeller of the character stated in which seperate driving motors are provided for effecting pitch angle changes of individual blades in synchronism, the arrangement of the motors and associated driving mechanism being such as to provide a compact, rugged, and balanced unit.

A further object is to provide a variable pitch propeller having improved operating characteristics and yet of simple, rugged, and economical construction.

A practical, and the at present preferred embodiment of the invention is shown in the accompanying drawings, in which:

Figure 1 is a view in front elevation of a propeller embodying the invention;

Figure 2 is a view on an enlarged scale partly in longitudinal section and partly in elevation of the propeller hub and associated parts;

Figure 3 is a view in transverse section taken on the line 3—3 of Figure 2;

Figure 4 is a fragmentary view in transverse section taken on the line 4—4 of Figure 2;

Figure 5 is a fragmentary longitudinal sectional view taken on the line 5—5 of Figure 3; and Figure 6 is a diagram of an electrical control circuit.

The propeller, shown for purpose of illustrating the invention by way of example, comprises a hub A adapted to be secured to a main drive shaft B and blades C and C' journalled in the hub on opposite sides of the shaft B, each being adapted to be turned about its raidal axis in a manner to be described later. The hub A may be secured to the shaft B by means of a nut 1 which is screwed on the threaded outer end portion 2 of the shaft, the nut and shaft end being capped by a cover 3 having threaded connection with a reduced threaded end portion 4 of the shaft.

The hub A is split and comprises an inner half 5 and an outer half 6 adapted to be secured to the inner half by means of bolts 7 passing through aligned openings in the hub halves proper and through lugs 8 thereon. The assembled hub halves are formed with bores 9—9' for providing parallel bearings on opposite sides of the shaft B in which the inner ends of the blades C and C' are journalled respectively. Each blade is mounted in the same manner as the other, with the exception that the blades extend into the hub from opposite sides of the latter. Therefore a description of the mounting of the blade C within the bore 9 and the construction and arrangement of the operating mechanism associated with the blade C will serve also as a description of the mounting of the blade C' and the construction and arrangement of the operating mechanism associated therewith. For convenience, the reference characters applied to the parts associated with the blade C' are primed, but otherwise are the same as those applied to corresponding parts associated with the blade C.

The bore 9 is provided at its left hand end (as viewed in Figure 2) with a circumferential groove 10 which receives a bushing 11, and at its other end is formed with a circumferential groove 12 which receives a ball bearing assembly 13. The inner end portion 14 of the blade C is shown in the illustrative form as being unitary with the blade proper and hollow. In effect, the portion 14 is broadly a blade-carrying sleeve and is provided with a peripheral flange 15 adapted to fit within that portion of the groove 12 not occupied by the bearing assembly 13 for maintaining the blade C against movement radially with respect to the propeller shaft B. The arrangement is such that the blade can turn freely within the bore 9. When the propeller is rotating, centrifugal force tends to throw the blade outwardly (to the left as viewed in Figure 2), causing the flange 15 on the blade to bear against the bearing assembly 13. Since the load due to centrifugal force is borne by the bearing assembly, the blade may rotate about its radial axis easily.

Mechanism for turning the blade about its radial axis is housed within a mechanism casing or housing 16 which is adapted to be secured within but which is readily removable from the hollow blade end 14, the arrangement being such that the mechanism housing 16 and the contained mechanism can be assembled as a unit and inserted endwise into the hollow blade end. To facilitate assembly of the mechanism within the housing, the latter is split into halves provided with lugs 17 which receive bolts 18 for securing the halves together. A spline S serves to hold the motor housing 16 and blade end 14 against relative rotation and set screws T hold the motor housing against movement longitudinally of the blade.

A motor mounted within the housing 16 includes a field winding 19 and an armature 20 one end 21 of the shaft of which is journalled as at 22 in the housing 16 and the other end 23 of which is journalled as at 24 in the housing. The end 23 of the armature shaft is provided with a worm 25 which meshes with a worm wheel 26 on one side of which is a stub shaft 27 mounted in a split bearing bracket 28 in the housing. On the other side of the worm wheel 26 is a stub shaft 29 formed with a worm 30 which meshes with a worm wheel 31 carried by a shaft 32 journalled in a bracket 33 carried by the mechanism housing. A pinion 34 is secured to the opposite end of the shaft 32 and meshes with a segmental rack 35 which is integral with the hub outer half 6 and which extends through registering slots or openings 36 and 37 in the hollow blade end 14 and the mechanism housing 16 respectively.

Operation of the motor drives the pinion 34 through the gearing described above, and since the rack 35 with which the pinion is in mesh is relatively fixed the operation of the motor causes the whole motor assembly including the casing 16 to turn about the radial axis of the blade C and consequently to turn the blade itself about its radial axis.

As previously stated, the mechanism for operating the blade C' is similar to that just described for operating the blade C. It should be noted, however, that the various elements of the two operating mechanisms are arranged symmetrically with respect to the propeller shaft B, this being important in order to maintain a balance of the entire propeller assembly. For example, the armature 20 of the motor for operating the blade C is disposed somewhat toward the left of the shaft B in Figure 2, whereas the armature 20' associated with the blade C' is disposed a like distance towards the right of the shaft B and the same distance above the shaft as the armature 20 is below the shaft. Moreover, the corresponding elements of the two mechanisms are of the same weight, so as to provide for the desired balance. It is important that in operation the blades C and C' be turned through equal angles about their radial axes, and to this end means independent of the driving mechanism is provided for synchronizing the turning movement of the two blades. In the form shown, intermeshing gear segments 38 and 38' are secured respectively to the blades C and C', the gears preferably being split and provided with lugs 39 and 39' which receive bolts 40 and 40' respectively for securing the gear segments to the blades C and C'. This arrangement assures equal turning movement of the two blades even if one motor should tend to operate a little faster than the other. The segmental gears are secured to the blades by clamping action so as to permit adjustment of the gears on the blades in order to provide for the initial setting of the blades at corresponding pitch angles.

In order to maintain the propeller in balance and further to assure synchronizing of the blade movements, segments 41 and 41' are secured respectively to the blades C and C' on the opposite side of the hub. These segments are also preferably split and provided with lugs 42—42' respectively adapted to receive bolts 43 and 43' respectively for securing the segments to the blades in adjusted position.

Preferably, the inner end of the blade C is closed by a cap 44 secured to the segmental gear 38 by means of screws 45, and the inner end of the blade C' is closed by a cap 44' secured to the segment 41' by means of screws 45'.

It will be understood that in operation the motors for effecting movement of the blades C and C' about their radial axes are operated in unison in one direction for increasing the pitch angle and in the opposite direction for decreasing the pitch angle. In order to make it possible for the operator to cause the pitch angle to be changed during rotation of the propeller assembly, the propeller shaft preferably is provided with four collecting rings 46, 47, 48 and 49 which form part of the control circuit shown diagrammatically in Figure 6. In this circuit conductors 50—51 and 50'—51' respectively connect the fields 19 and 19' in parallel across the rings 46 and 47. Conductors 52—53 and 52'—53' respectively connect the armatures 20—20' in parallel to the rings 48 and 49. Conductors 54 and 55 connect the rings 48 and 59 to a polarity-changing switch 56, and conductors 57 and 58 connect the rings 46 and 47 to a cut-off switch 59, these switches being located at a point accessible to the operator. The arrangement is such that the polarity of the electromotive force applied to the armatures can be reversed without reversing the polarity of the fields, so that the motors may be started, stopped, and reversed at will.

From the foregoing it is apparent that the propeller illustrated by way of example is of compact and rugged construction and adapted for economical manufacture. The mechanism is sure in its action so that the pitch of the blades can be controlled with safety during flight. The long bearing supports provided by the bushings 10—10' and the assemblies 13—13' provides a rigid, strong construction capable of standing up under high rotative speeds.

Various changes may be made in the specific construction and arrangement of the parts without departing from the invention as defined in the appended claims.

Having thus described the said invention, what is claimed and desired to secure by Letters Patent is:

1. In a variable pitch propeller, the combination of a hub; two blades having hollow inner ends journalled in the hub; a motor mounted within the inner end of one blade and operatively connected thereto; and driving connections between said motor, said other blade, and said hub.

2. In a variable pitch propeller, the combination of a hub; two blades having hollow inner ends journalled in the hub; motors mounted within the inner end of each blade and operatively connected thereto respectively; and driving connections between said motors and said hub.

3. In a variable pitch propeller, the combination of a hub; two blades having hollow inner ends journalled in the hub; a motor mounted within the inner end of one blade and operatively connected thereto; driving connections between said motor and said hub; and synchronizing connections between said two blades and independent of said driving connections.

4. In a variable pitch propeller, the combination of a hub provided with two parallel bearings located on opposite sides of the axis of the hub; two blades having their inner ends journalled respectively in said bearings; a motor mounted within the journalled end of one of said blades; and connections between said motors, said blades, and said hub.

5. In a variable pitch propeller, the combination of a hub provided with two parallel bearings located on opposite sides of the axis of the hub; two blades having hollow inner ends journalled respectively in said bearings; a motor mounted within the inner end of one blade and operatively connected thereto; driving connections between said motor, said other blade, and said hub; and symmetrically disposed means within the inner end of said other blade for balancing said propeller.

6. In a variable pitch propeller, the combination of a hub provided with two parallel bearings located on opposite sides of the axis of the hub; two blades having hollow inner ends journalled respectively in said bearings; motors mounted within the inner end of each blade and operatively connected thereto respectively; and driving connections between said motors and said hub.

7. In a variable pitch propeller, the combination of a hub provided with two parallel bearings located on opposite sides of the axis of the hub; two blades having hollow inner ends journalled respectively in said bearings and extending completely through said bearings; and interengaging gears secured respectively to both blades at each end of said bearings, said gears being constructed and located relative to the axis of said hub to balance said propeller.

8. In a variable pitch propeller, the combination of a hub provided with two parallel bearings located on opposite sides of the axis of the hub; two blades having their inner ends journalled respectively in said bearings and extending completely through said bearings; and interengaging gears secured respectively to both blades at each end of said bearings, said gears being constructed and located relative to the axis of said hub to balance said propeller.

9. In a variable pitch propeller, the combination of a hub; two blades journalled for axial turning movement in said hub, one of said blades being hollow at its journalled inner end; a hollow motor housing separable from but positioned within and secured to said hollow blade end and adapted to be inserted endwise into said blade end; a motor fixed in said housing; and driving connections between said motor, said other blade, and said hub.

10. In a variable pitch propeller, the combination of a hub; two blades journalled for axial turning movement in said hub, one of said blades being hollow at its journalled inner end; a split hollow motor housing separable from but positioned within and secured to said hollow blade end and adapted to be inserted endwise into said blade end; a motor fixed in said housing; and driving connections between said motor, said other blade, and said hub.

11. In a variable pitch propeller, the combination of a hub; two blades journalled for axial turning movement in said hub, one of said blades being hollow at its journalled inner end; a hollow motor housing separable from but positioned within and secured to said hollow blade end and adapted to be inserted endwise into said blade end; a peripheral slot in said hollow blade end; a motor fixed in said housing, driving connections between said motor and said hub extending through said slot; and synchronizing connections between said blades.

12. In a variable pitch propeller, the combination of a hub; two blades journalled for axial turning movement in said hub, one of said blades being hollow at its journalled inner end; a hollow motor housing separable from but positioned within and secured to said hollow blade end and adapted to be inserted endwise into said blade end; a motor mounted in said housing; a peripheral slot in said hollow blade end; a toothed segment on said hub extending inwardly into said slot; a motor driven pinion in mesh with said segment; and synchronizing connections between said blades.

13. In a variable pitch propeller, the combination of a hub provided with two parallel bearings located on opposite sides of the axis of the hub; two blades having their inner ends journalled respectively in said bearings; a motor mounted within said housing; and connections between said motor, said blades and said hub.

14. In a variable pitch propeller, the combination of a hub provided with two parallel bearings located on opposite sides of the axis of the hub; two blade-carrying sleeves journalled respectively in said bearings; a motor mounted within one of said sleeves; and operating connections between said motor, said blade, and said hub.

15. In a variable pitch propeller, the combination of a hub provided with two parallel bearings located on opposite sides of the axis of the hub; two blade-carrying sleeves journalled respectively in said bearings; a motor mounted within one of said sleeves; operating connections between said motor, said blade, and said hub; interengaging gears secured respectively to said sleeves for synchronizing axial turning of the latter; and means for securing one of said gears in adjusted position on its associated sleeve to permit initial synchronizing of said sleeves.

MARION O'BRYAN,
*Administratrix of the Estate of Francis L. O'Bryan, Deceased.*